(12) United States Patent
Pelly et al.

(10) Patent No.: US 7,487,355 B2
(45) Date of Patent: *Feb. 3, 2009

(54) DATA PROCESSING APPARATUS AND METHOD

(75) Inventors: Jason Charles Pelly, Reading (GB); Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 902 days.

This patent is subject to a terminal disclaimer.

(21) Appl. No.: 10/317,631

(22) Filed: Dec. 12, 2002

(65) Prior Publication Data

US 2003/0123658 A1    Jul. 3, 2003

(30) Foreign Application Priority Data

Dec. 13, 2001    (GB) .................................. 0129840.5

(51) Int. Cl.
*H04L 9/00* (2006.01)
*G06K 9/00* (2006.01)
*G09C 3/00* (2006.01)
*G09C 5/00* (2006.01)
*H04N 7/167* (2006.01)

(52) U.S. Cl. ...................... 713/176; 382/100; 380/210; 380/54

(58) Field of Classification Search .................. None
See application file for complete search history.

(56) References Cited

U.S. PATENT DOCUMENTS 5,949,885 A * 9/1999 Leighton ..................... 380/54

(Continued)

FOREIGN PATENT DOCUMENTS

| EP | 0 860 997 | 8/1998 |
| EP | 1 089 550 | 4/2001 |
| EP | 1 217 840 | 6/2002 |
| WO | WO 99/45705 | 9/1999 |
| WO | WO 00 33282 | 6/2000 |
| WO | WO 01 11563 | 2/2001 |

OTHER PUBLICATIONS

Cox, I. J.; Kilian,-J.; Leighton, F.T.; Shamoon, T., Secure Spread Spectrum Watermarking for Multimedia, Dec. 1997, Image Processing, IEEE Transaction on, vol. 6, Issue 12, pp. 1673-1687.*

(Continued)

*Primary Examiner*—Ayaz R Sheikh
*Assistant Examiner*—Arezoo Sherkat
(74) *Attorney, Agent, or Firm*—Oblon, Spivak, McClelland, Maier & Neustadt, P.C.

(57) ABSTRACT

A watermarking system comprises an encoding data processor operable to generate at least one marked version of an original item of material by introducing one of a predetermined set of code words into a copy of the original material item. The encoding data processor is arranged to form other code words of the set by cyclically shifting a first code word. The system includes a detecting data processor operable to identify the code word in the marked material item. The detecting data processor is operable to recover the code word from the marked material item and to form a Fourier transform of the recovered code word and a Fourier transform of the first code word of the set. The data detecting processor forms correlation samples by forming an inverse transform of a combination of the recovered and the first code word. Each of the correlation value samples provides the correlation value for one of the set of code words. A computationally efficient way of calculating the correlation for each code word in the set is thereby provided. As a result a time taken to detect a code word present in a marked material item is improved. The watermarking system finds particular application in identifying a point of distribution of pirate copies of video material generated by capturing the watermarked image, using, for example, a camcorder in a cinema.

20 Claims, 6 Drawing Sheets

U.S. PATENT DOCUMENTS

| | | | |
|---|---|---|---|
| 6,104,826 A * | 8/2000 | Nakagawa et al. | 382/100 |
| 6,424,725 B1 * | 7/2002 | Rhoads et al. | 382/100 |
| 6,738,493 B1 * | 5/2004 | Cox et al. | 382/100 |
| 2002/0037091 A1 * | 3/2002 | Terasaki | 382/100 |
| 2003/0099355 A1 * | 5/2003 | Moroney | 380/210 |
| 2005/0108541 A1 * | 5/2005 | Yacobi et al. | 713/176 |

OTHER PUBLICATIONS

Wang, Q.; Shenghe, S., DCT-Based Image-Independent Digital Watermarking, 21-25, Signal Precessing Proceedings, 2000. WCCC-ICSP 2000, 5th International Conference on, vol. 2, pp. 942-945.*

Baitello R. et al.: "From Watermark detection to watermark decoding : a PPM approach" Signal Processing, Amsterdam, NL, vol. 81, No. 6, Jun. 2001, pp. 1261-1271, XP004241226 ISSN: 0165-1684.

Kalker T. et al.: "A Video Watermarking System for Broadcast Monitoring" Proceedings of the SPIE, SPIE, Bellingham, VA, US, vol. 3657, Jan. 25, 1999, pp. 103-112, XP000949142 ISSN: 0277-786X.

Duan F. Y. et al.: "Intra-block algorithm for digital watermarking" Pattern Recognition, 1998. Proceedings. Fourteenth International Conference on Brisbane, Qld., Australia Aug. 16-20, 1998, Los Alamitos, CA, USA, IEEE Comput. SOC, US, Aug. 16, 1998, pp. 1589-1591, XP010297885 ISBN: 0-8186-8512-3.

Haitsma J. et al.: "A watermarking scheme for digital cinema" Proceedings 2001 International Conference on Image Processing. ICIP 2001. Thessaloniki, Greece, Oct. 7-10, 2001, International Conference on Image Processing, New York, NY: IEEE, US, vol. 1 of 3. Conf. 8, Oct. 7, 2001 pp. 487-489, XP010563804 ISBN: 0-7803-6725-1.

* cited by examiner

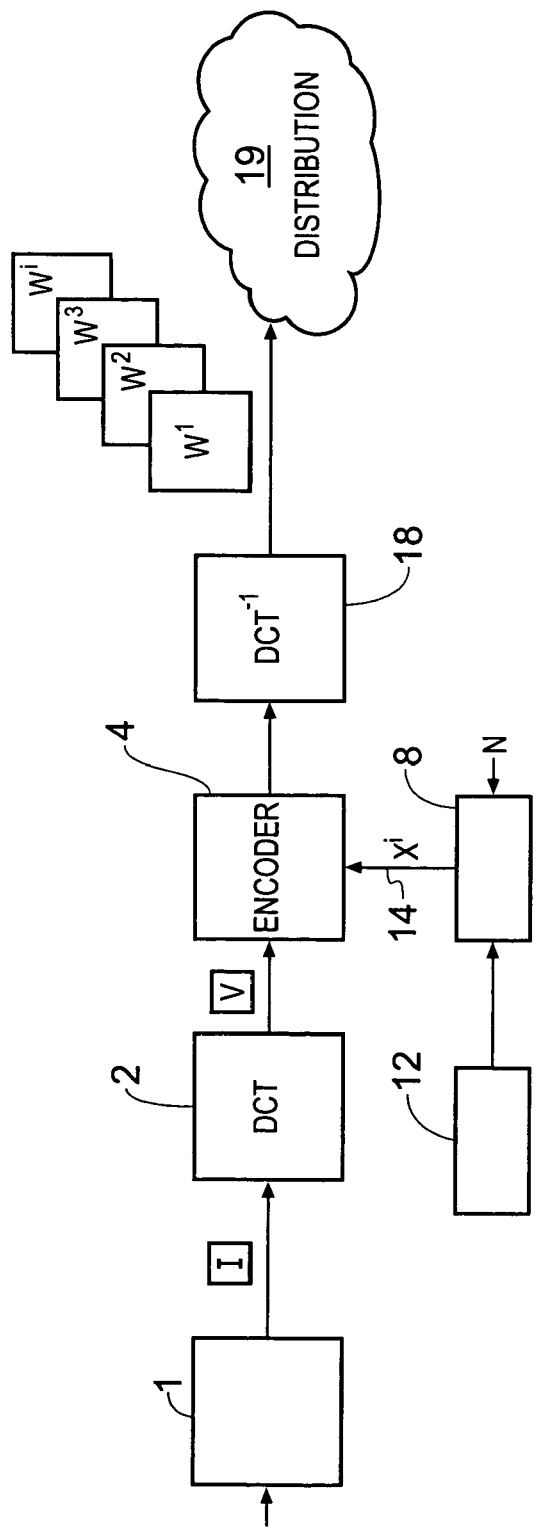
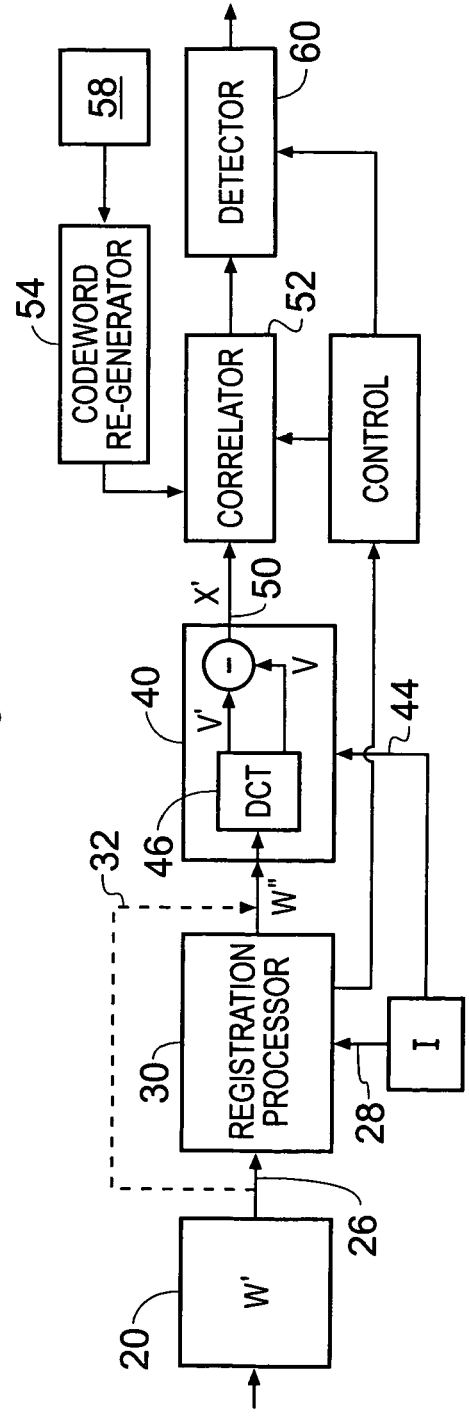
Fig. 1
Fig. 2

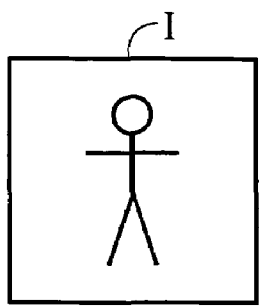
Fig. 3A
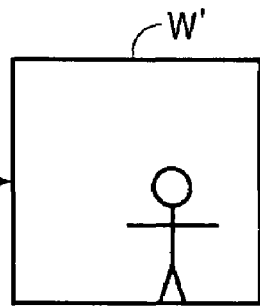
Fig. 3B
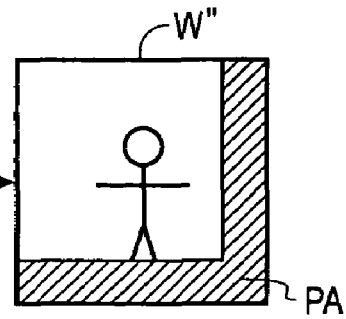
Fig. 3C
Fig. 3
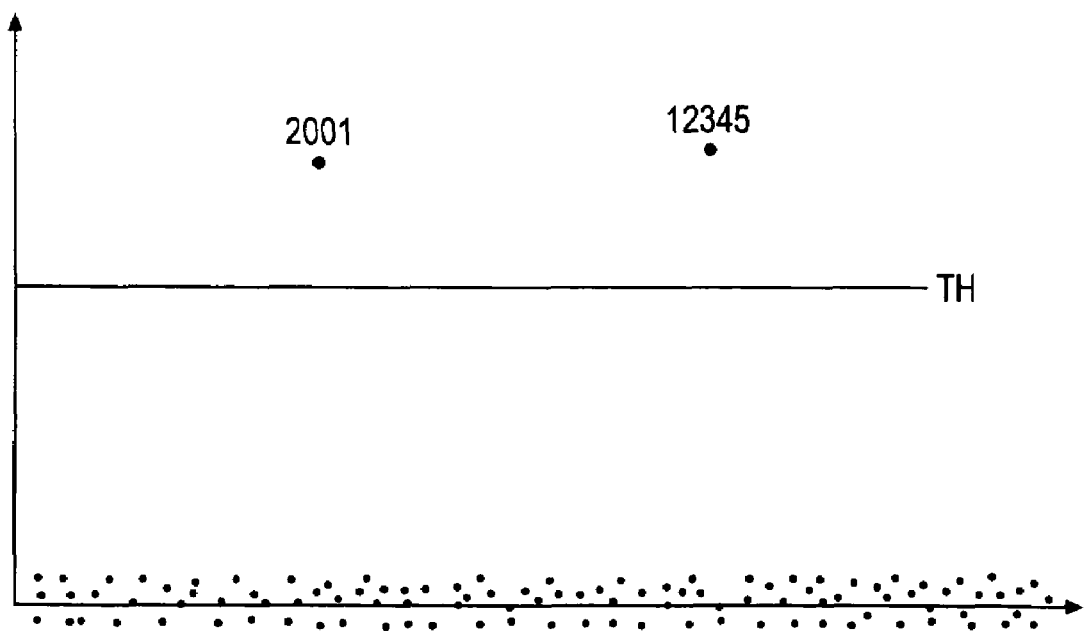
Fig. 4

DATA PROCESSING APPARATUS AND METHOD

FIELD OF INVENTION

The present invention relates to encoding data processing apparatus and methods, which are arranged to embed code words into versions of material items. In some applications the code words are used to uniquely identify the material items.

Correspondingly, the present invention also relates to data processing apparatus and methods operable to detect one or more code words, which may be present in a material item.

BACKGROUND OF THE INVENTION

A process in which information is embedded in material for the purpose of identifying the material is referred to as watermarking.

Identification code words are applied to versions of material items for the purpose of identifying the version of the material item. Watermarking can provide, therefore, a facility for identifying a recipient of a particular version of the material. As such, if the material is copied or used in a way which is inconsistent with the wishes of the distributor of the material, the distributor can identify the material version from the identification code word and take appropriate action.

In this description, an item of material, which is copied or used in a way, which is inconsistent with the wishes of the originator, owner, creator or distributor of the material, will be referred to for convenience as an offending item of material or offending material.

The material could be any of video, audio, audio/video material, software programs, digital documents or any type of information bearing material.

For a watermarking scheme to be successful, it should be as difficult as possible for the users to collude in order to mask or remove the identification code words. It should also be as difficult as possible for users to collude to alter the identification code word to the effect that one of the other users is falsely indicated as the perpetrator of an offending item of material. Such an attempt by users to collude to either mask the code word or alter the code word to indicate another user is known as a collusion attack.

Any watermarking scheme should be arranged to make it difficult for users receiving copies of the same material to launch a successful collusion attack. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty of taking part in a collusion attack, when this user has not taken part, should be as low as possible (false positive probability).

U.S. Pat. No. 5,664,018 discloses a watermarking process in which a plurality of copies of material items are marked with a digital watermark formed from a code word having a predetermined number of coefficients. The watermarked material item is for example an image. The apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT. A related publication entitled "Resistance of Digital Watermarks to Collusion Attacks", by J. Kilian, F. T. Leighton et al, published by MIT, Jul. 27, 1998, provides a detailed mathematical analysis of this watermarking process to prove its resistance to attack.

SUMMARY OF INVENTION

According to an aspect of the present invention there is provided an encoding data processing apparatus for generating at least one marked version of an original item of material by introducing one of a predetermined set of code words into a copy of the material item. The encoding data processing apparatus comprises a code word generator operable to generate a first code word using a pseudo-random number generator. The pseudo-random number generator is operable to generate pseudo-random numbers from which code word coefficients of the first code word are derived. The encoding data processor includes an encoding processor operable to permute an order of the coefficients of a code word for combining with the material item in accordance with a permutation code. The encoding processor combines the code word coefficients with the material item in accordance with the permuted order. The code word generator is operable to generate the pseudo-random numbers for the first code word coefficients from a seed value for initialising the pseudo-random number generator. The seed value uniquely defines the first code word. The code word generator generates other code words of the set from a cyclic shift of the first code word.

Permuting the code word coefficients provides an advantage of reducing the likelihood of a successful collusion attack, which may increase by forming the code words from cyclically shifting the first code word.

The present invention aims to provide a practical watermarking system, which utilises code words having coefficients which are randomly distributed as proposed as in U.S. Pat. No. 5,664,018. In order to implement a practically useful system the number of uniquely identifiable code words in the set should be as high as possible. For a consumer distributed product such as a video or a film for display at a cinema, there should be in the order of a million or preferably tens of millions of code words in the set. As such, it will be appreciated that forming a correlation of each of the regenerated code words in the set of ten million and the recovered code word represents a considerable computational task. As such even for high performance computers, such a correlation would require an impracticably long time or at least an inconveniently long time. Embodiments of the present invention are provided with advantages with respect to calculating the correlation values for the code words in the set. This is provided by forming at least some of the code words of the set by generating a first code word and generating other code words by cyclically shifting the first code word. As such the correlation values for all code words of the set can be calculated using a Fourier transform correlator. As will be explained, the Fourier transform correlator provides the correlation values for the set in one operation, substantially reducing the computational task.

According to an aspect of the present invention there is provided a data processing apparatus comprising a decoding processor operable to generate a recovered code word from a marked material item, and a detection processor operable to detect at least one code word from marked material item. The code word is detected from correlation values produced by correlating the recovered code word with each one of a plurality of regenerated code words. A code word is detected if the corresponding correlation value exceeds a predetermined threshold. The correlation value is formed for a plurality of the code words by forming a Fourier transform of the recovered code word, forming a Fourier transform of the first code word of said set, forming the complex conjugate of one of the Fourier transform of the recovered code word and the Fourier transform of the regenerated code word, forming intermediate product samples by multiplying each of said Fourier transform samples of said recovered code word and the corresponding Fourier transform samples of said first code word, forming correlation samples by forming an inverse transform of said intermediate product samples, each of said correlation value samples providing the correlation value for one of said set of code words.

In some embodiments the detecting data processor is arranged to reverse a permutation of either the re-generated code word coefficients or the recovered code word coefficients which may have been applied to the code word in the marked material item order to determine the correlation values.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which:

FIG. 1 is a schematic block diagram of an encoding image processing apparatus;

FIG. 2 is a schematic block diagram of a detecting image processing apparatus;

FIG. 3A is a representation of an original image, FIG. 3B is a representation of a marked image and FIG. 3C is the marked image after registration;

FIG. 4 is a graphical representation of an example correlation result for each of a set of N code words;

DESCRIPTION OF PREFERRED EMBODIMENTS

Watermarking System Overview

Figure 5A:
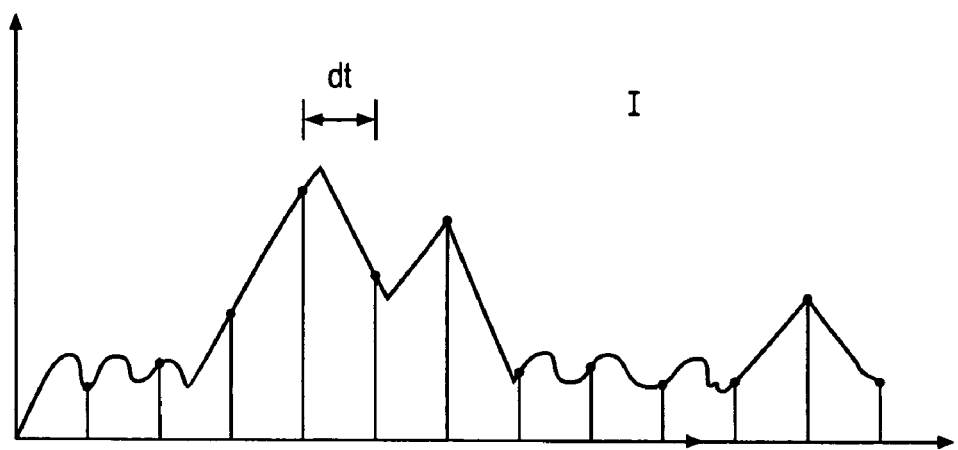
FIG. 5A is a graphical representation of samples of the original image I.

An example embodiment of the present invention will now be described with reference to protecting video images. The number of users to which the video images are to be distributed determines the number of copies. To each copy an identification code word is added which identifies the copy assigned to one of the users.

Video images are one example of material, which can be protected by embedding a digital code word. Other examples of material, which can be protected by embedding a code word, include software programs, digital documents, music, audio signals and any other information-bearing signal.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which is otherwise, produce from the image pixels. Therefore, where appropriate the terms samples and pixels are inter-changeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus for each code word there is a corresponding seed which is store in a data store 12. Therefore it will be understood that to generate the code word $X^i$, $seed_i$ is retrieved from memory 12 and used to initialise the random number generator within the code word generator 8.

In the following description the DCT version of the original image is represented as V, where;

$$V=\{v_i\}=\{v_1,v_2,v_3,v_4,\ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i=\{x_j^i\}=\{x_1^i,x_2^i,x_3^i,x_4^i,\ldots x_n^i\}$$

The number of code word coefficients n corresponds to the number or samples of the original image V. However, a different number of coefficients is possible, and will be set in dependence upon a particular application.

A vector of code word coefficients $X^i$ forming the i-th code word is then passed via channel 14 to the encoder 4. The encoder 4 is arranged to form a watermarked image $W^i$ by adding the code word $X^i$ to the image V. Effectively, therefore, as represented in the equation below, each of the code word coefficients is added to a different one of the coefficients of the image to form the watermark image $W^i$.

$$W^i = V + X^i$$

$$W^i = v_1 + x_1^i, v_2 + x_2^i, v_3 + x_3^i, v_4 + x_4^i, \ldots, v_n + x_n^i$$

As shown in FIG. 1, the watermarked images $W^i$ are formed at the output of the image processing apparatus by an forming inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10 000 000 code words can be selected to generate 10 million watermarked $W^i$ versions of the original image I.

Although the code word provides the facility for uniquely identifying a marked copy $W^i$ of the image I, in other embodiments the 20 bits can provide a facility for communicating data within the image. As will be appreciated therefore, the 20 bits used to select the identification code word can provide a 20 bit pay-load for communicating data within the image V.

The encoding image processing apparatus which is arranged to produce the watermarked images shown in FIG. 1 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema. Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed. Generally therefore, the distribution of the watermarked images produced by the encoding image processing apparatus shown in FIG. 1 is represented by a distribution cloud 19.

Detecting Processor

A detecting image processing apparatus which is arranged to detect one or more of the code words, which may be present in an offending marked image is shown in FIG. 2. Generally, the image processor shown in FIG. 2 operates to identify one or more of the code words, which may be present in an offending copy of the image.

The offending version of the watermarked image W' is received from a source and stored in a frame store 20. Also stored in the frame store 20 is the original version of the image I, since the detection process performed by the image processor requires the original version of the image. The offending watermarked image W' and the original version of the image are then fed via connecting channels 26, 28 to a registration processor 30.

As already explained, the offending version of the image W' may have been produced by photographing or otherwise reproducing a part of the watermarked image $W^i$. As such, in order to improve the likelihood of detecting the identification code word, the registration processor 30 is arranged to substantially align the offending image with the original version of the image present in the data store 20. The purpose of this alignment is to provide a correspondence between the original image samples I and the corresponding samples of the watermarked image $W^i$ to which the code word coefficients have been added.

The effects of the registration are illustrated in FIG. 3. In FIG. 3 an example of the original image I is shown with respect to an offending marked version of the image W'. As illustrated in FIG. 3, the watermarked image W' is offset with respect to the original image I and this may be due to the relative aspect view of the camera from which the offending version of the watermarked image was produced.

In order to recover a representation of the code word coefficients, the correct samples of the original image should be subtracted from the corresponding samples of the marked offending image. To this end, the two images are aligned. As shown in FIG. 3, the registered image W''' has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting image processor is provided with an alternative channel 32, which communicates the marked image directly to the recovery processor 40.

The registered image W''' is received by a recovery processor 40. The recovery processor 40 also receives a copy of the original image I via a second channel 44. The registered image W''' and the original image I are transformed by a DCT transform processor 46 into the DCT domain. An estimated code word X' is then formed by subtracting the samples of the DCT domain marked image V' from the DCT domain samples of the original image V as expressed by the following equations:

$$\begin{aligned} X' &= V' - V \\ &= v_1' - v_1, v_2' - v_2, v_3' - v_3, v_4' - v_4, \ldots, v_n' - v_n, \\ &= x_1', x_2', x_3', x_4', \ldots x_n' \end{aligned}$$

The output of the recovery processor 40 therefore provides on a connecting channel 50 an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x_1^i \cdot x_1' + x_2^i \cdot x_2' + x_3^i \cdot x_3' + \ldots + x_n^i \cdot x_n'}{\sqrt{x_1^i \cdot x_1' + x_2^i \cdot x_2' + x_3^i \cdot x_3' + \ldots + x_n^i \cdot x'}}$$

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million and the watermarking strength α, the height of the threshold TH can be set in order to guarantee the false detection probability. As in the example in FIG. 4, if the similarity values produced by the correlator 52 exceed the threshold then, with this false positive probability, the recipients of the marked image are considered to have colluded to form the offending watermarked version of the image $W^i$.

The following sections illustrate advantages and features of the operation of the watermarking system illustrated in FIGS. 1 and 2.

Registration

The process of aligning the offending marked version of the image with the copy of the original image comprises correlating the samples of the original image with respect to the marked image. The correlation is performed for different shifts of the respective samples of the images. This is illustrated in FIG. 5.

Figure 5B:
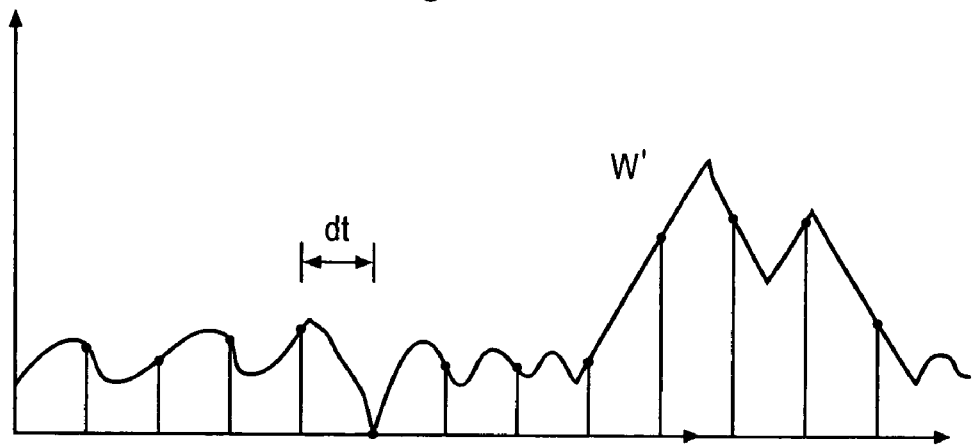
FIG. 5B is a graphical representation of samples of the watermarked image W'.

FIG. 5A provides an illustration of discrete samples of the original image I, whereas FIG. 5B provides an illustration of discrete samples of the offending watermarked image W'. As illustrated in the FIGS. 5A and 5B, the sampling rate provides a temporal difference between samples of dt. A result of shifting each of the sets of samples from the images and correlating the discrete samples is illustrated in FIG. 5C.

Figure 5C:
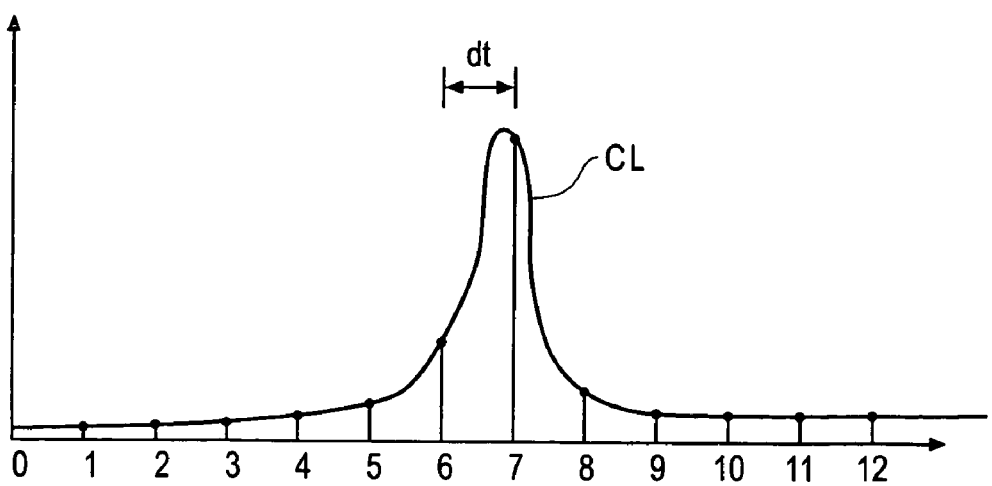
FIG. 5C is a graphical representation of correlation results for the original image and the watermarked image with respect to discrete sample shifts.

As shown in FIG. 5C, for a shift of between 6 and 7 samples, the correlation peak is highest. The offending watermarked image is therefore shifted by this amount with respect to the original image to perform registration.

Fourier Decoding

As explained, with reference to FIGS. 1 and 2, the watermarking system can provide a facility for generating 10 million watermarked versions of an original image. This is effected using a 20-bit watermark value. However, as explained, in order to detect the presence of one of the code words in an offending watermarked image, the detecting image processor must correlate each of the possible code words in the set of 10 million code words with respect to a recovered code word from the image. As will be appreciated, this represents a considerable computational task.

Figure 6:
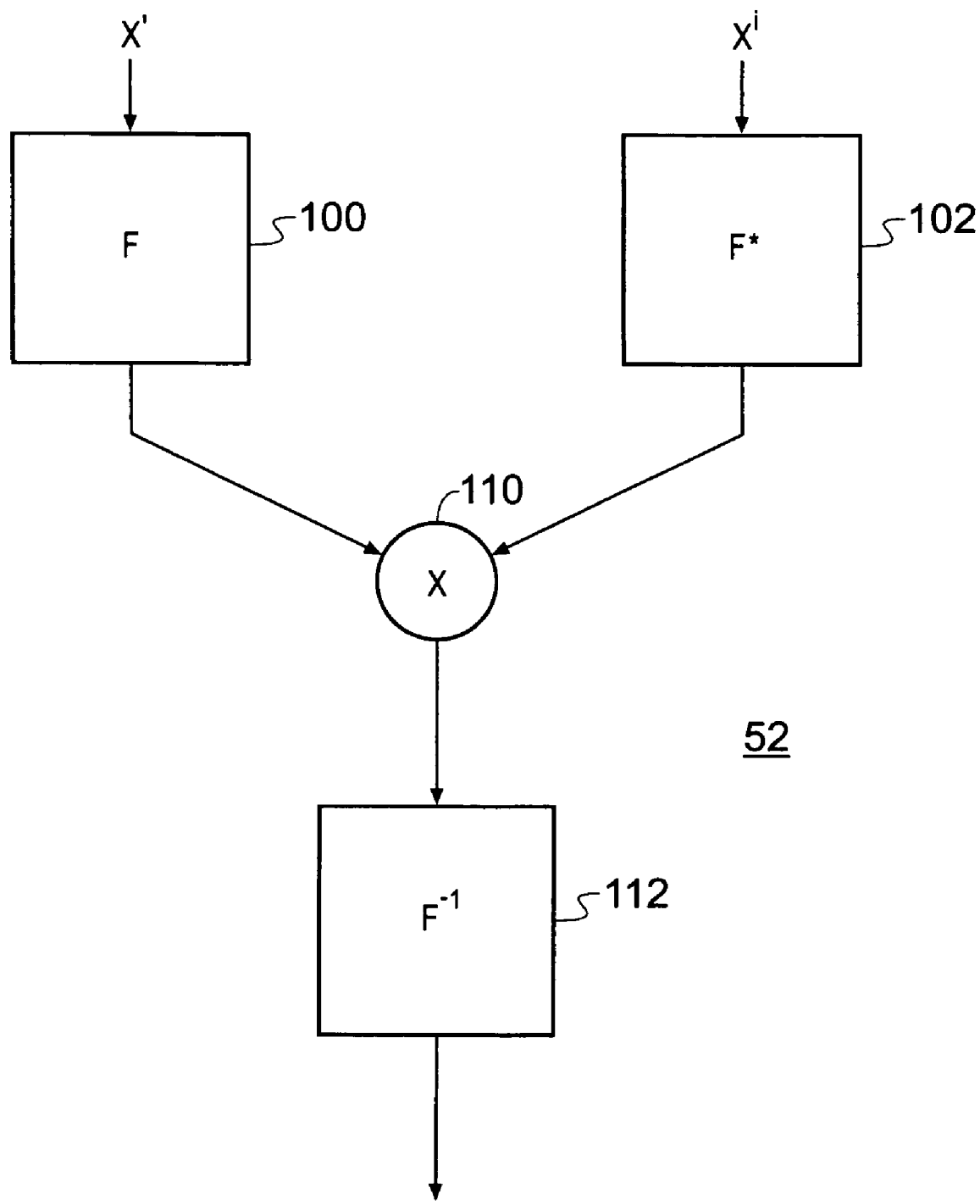
FIG. 6 is a schematic block diagram of a correlator forming part of the detecting data processing apparatus shown in FIG. 2.

A correlator embodying the present invention provides a significant advantage in reducing the computational effort and therefore the time taken to detect the presence of a code word in an offending watermarked image. A correlator in accordance with the embodiment of the present invention is illustrated in FIG. 6. The correlator shown in FIG. 6 takes advantage of an alternative technique for calculating the correlation sum shown above. In accordance with this technique the correlation sum is calculated in accordance with the following equation:

$$F^{-1}[F(X')F(X^{(1)})^*],$$

where F(A) is the Fourier transform of A and $F^{-1}(A)$ is the inverse Fourier transform of A.

The correlator 52 shown in FIG. 6 therefore comprises a first Fourier transform processor 100, and a second Fourier transform processor 102. Fourier transform processors 100, 102 may be implemented using Fast Fourier transform algorithms. The second Fourier transform processor 102 also forms the complex conjugate of the Fourier transform of the regenerated code word $X^1$. The Fourier transform of the recovered code word X' and the complex conjugate of the Fourier transform of the regenerated code word $X^i$ are fed to first and seconds inputs of a multiplier 110. The multiplier 110 multiplies the respective samples from each of the Fourier transform processors 100, 102 and feeds the multiplied samples to an inverse Fourier transform processor 112. At the output of the correlator an inverse Fourier transform of the multiplied signals samples is formed.

As will be appreciated, the implementation of the correlator 52 shown in FIG. 6 provides an advantage in terms of time taken to compute the correlation for the n sample values of the regenerated code word $X^i$ and the recovered code word X'. This is because the Fourier processors 100, 102, 112 can be formed from FFT integrated circuits such as, for example, are available as ASICS. Furthermore, the inverse Fourier transform provided at the output of the corrolator 52 provides n similarity values sim(i) corresponding to n correlation sums. However, in order to utilise the properties of the corrolator 52, shown in FIG. 6 the code words are arranged to be generated by cyclically shifting one code word generated $X^{(1)}$ using a particular seed for the random number generator. This is illustrated below. As shown below, the first code word $X^{(1)}$ is represented as values $x_1$ to $x_n$ which corresponds to the pseudo randomly produced numbers from the code word generator 8. However, the second code word $X^{(2)}$ is produced by performing a cyclic shift on the first code word $X^{(1)}$. Correspondingly, each of the other code words are produced by correspondingly cyclically shifting further the code word $X^{(1)}$ until the n-th code word is a code word shifted by n−1 positions.

$$X^{(1)} \to (x_1, x_2, x_3, x_4 \ldots, x_{n-1}, x_n)$$

$$X^{(2)} \to (x_2, x_3, x_4 \ldots, x_{n-1}, x_n, x_1)$$

$$X^{(3)} \to (x_3, x_4 \ldots, x_{n-1}, x_n, x_1, x_2)$$

- - -

$$X^{(n)} \to (x_n, x_1, x_2, x_3, x_4, \ldots x_{n-2}, x_{n-1})$$

By using this set of code words to form part of, or the whole of, the set of code words produced by the encoding image processor, the Fourier transform correlator 52 can be used to generate in one operation all similarity values for all of the n code words. Therefore, as illustrated above, the corresponding shift of 1 to n of the original code word provides the n similarity values sim(i), and as illustrated in FIG. 4, for at least one of the code words, a large similarity value sim(i) is produced. Therefore, as will be appreciated the correlator 52 only receives one regenerated code word corresponding to first code word $X^{(1)}$ to form the similarity values for the set of n code words as illustrated in FIG. 4.

As will be appreciated from the above explanation, if the code word contains N samples, then only N unique cyclic shifts are possible. Therefore, if the required population of code words is p, which is greater than N, then several base watermarks will be required. Each base watermark can be cyclically shifted to produce N unique code words.

If the watermarked image forms one of a plurality of images in, for example, a video sequence, then the same code word will be added to each of the images. As such, once the suspected code word has been identified using the Fourier transform corrolator illustrated in FIG. 6, then a subsequent correlation can be formed using the full correlation sum sim (i) as explained above. However, because the suspected code word has already been identified, then the correlation only needs to be performed once for the code word identified by the Fourier transform correlator shown in FIG. 6.

As will be appreciated, instead of forming the conjugate of the Fourier transform of the regenerated first code word $X^1$, the conjugate of the Fourier transform of the recovered code word could be formed. This is expressed by the second alternative of the Fourier transform correlator shown below:

$$F^{-1}[F(X')*F(X^{(1)})]$$

Accordingly the conjugate of one of the Fourier transform of the recovered code word and the Fourier transform of the regenerated code word is formed by the Fourier transform processors 100, 102.

Secret Permutation of Code Words

One disadvantage of forming a code word from a cyclic shift of a first code word $X^1$ is that the security of the watermark may be compromised. This is because under a collusion attack two watermarked images are compared. If the same code word has been added to each image, with only a cyclic shift with respect to two versions of the same code word, an attacker may be more likely to identify the differences between the two marked material items and therefore identify the code word. With knowledge of the code word an attacker may either remove the watermark or alter the watermark to falsely implicate another.

In order to reduce the likelihood of a successful collusion attack, the order of each of the code word coefficients of each of the cyclically shifted code words is randomly permuted in accordance with a secret permutation code $\pi$. The permutation of the code word coefficients remains secret from the recipients of the marked images. Accordingly the likelihood of a successful collusion attack is reduced by an increase in the difficulty presented to a collusion attacker of identifying a correlation between two marked images.

Figure 7:
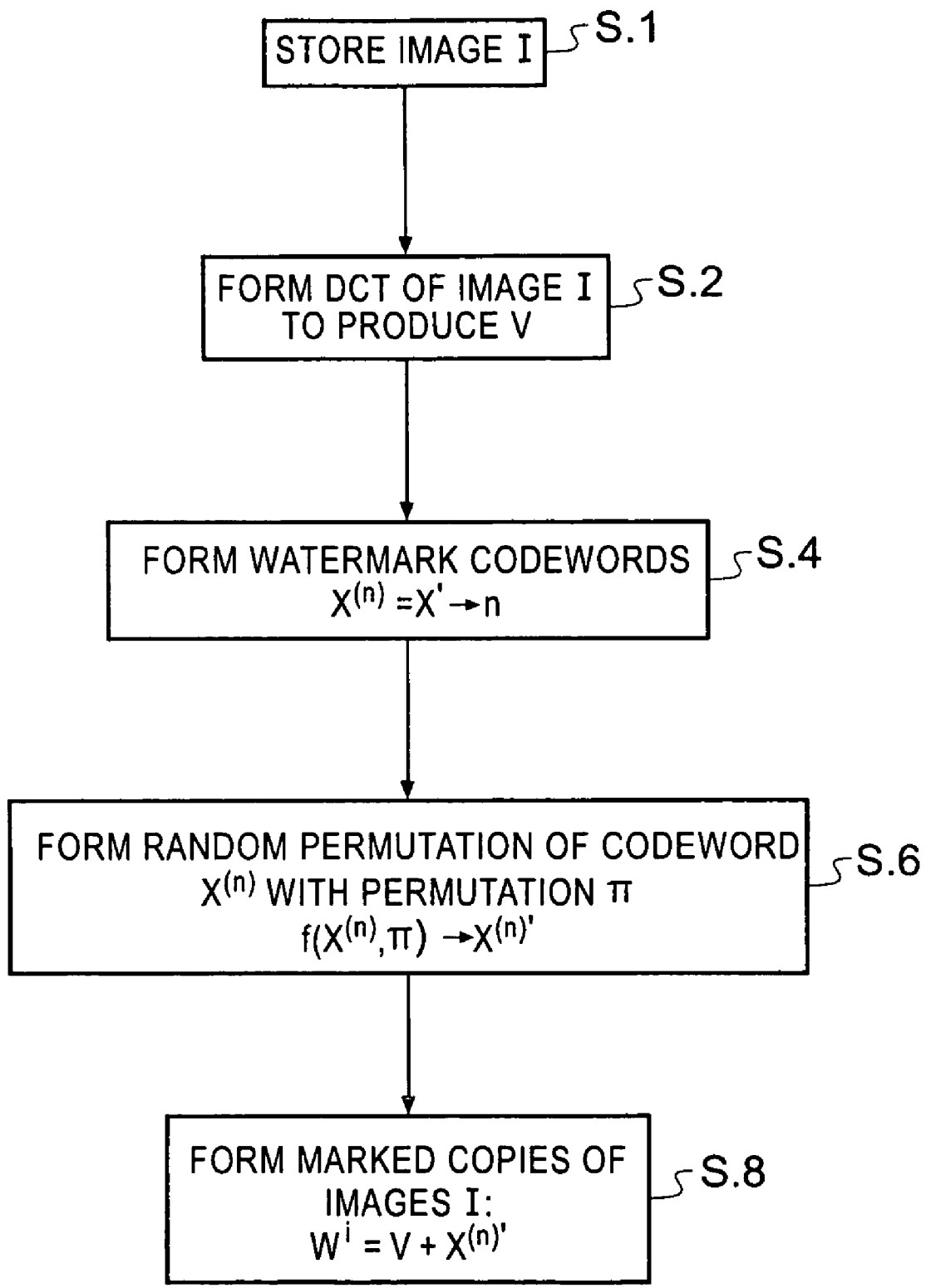
FIG. 7 is a flow diagram of a process for forming watermarked images performed by the encoding image data processor.
Figure 8:
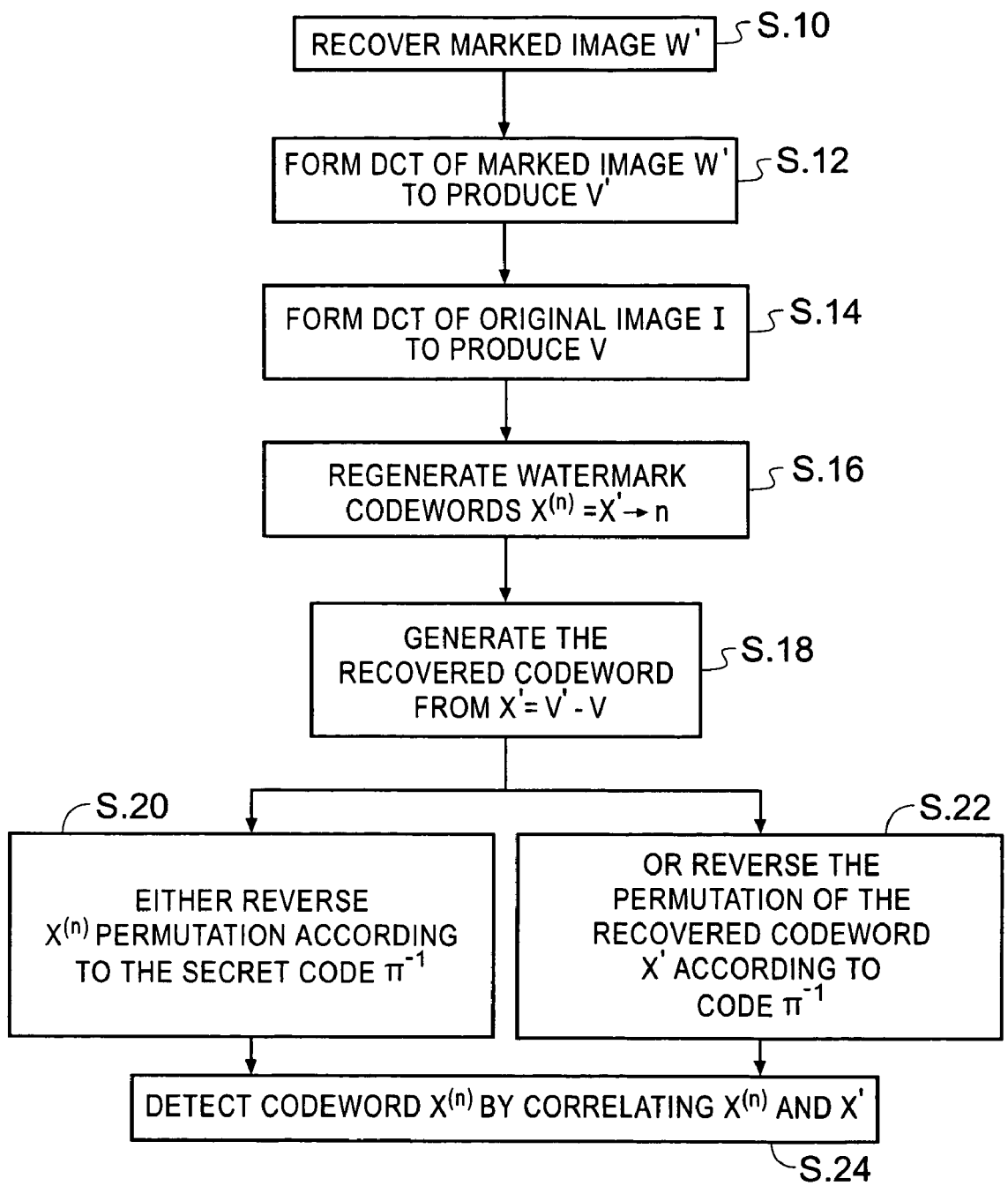
FIG. 8 is a flow diagram of a process for identifying a watermark from a received marked copy of the image performed by the detecting data processor of FIG. 2.

At the detecting data processor the secret permutation code $\pi$ will be known. In the detecting data processor, either the code word re-generator or the recovery processor 40 is operable to reverse the permutation $\pi^{-1}$ of either the re-generated code word coefficients or the recovered code word coefficients in order to perform the correlation. The operation of the encoding data processor of FIG. 1 and the detecting data processor of FIG. 2 is therefore as presented in a flow diagrams in FIGS. 7 and 8 respectively.

Code Word Generation

A further advantageous aspect of the embodiment shown in FIGS. 1 and 2 is provided by generating the seed of the random number from which the code word is produced from the source image samples. This is affected by analysing the DCT coefficients of the image to be watermarked and from these coefficients, generating the seed to be used to generate the code word. This can be effected, for example, by using a hashing algorithm known to those skilled in the art as "secure hashing algorithm 1" (sha-1). This algorithm forms an ANSI standard (ANSI x9.30-2). This algorithm is referred to in a book entitled "Handbook of applied cryptography" by A. J. Menezes. As such the seed from the random number can be generated and determined in the encoding image processor and the detecting image processor from the DCT coefficients.

Other Applications

In addition to the above-mentioned applications of the encoding data processing apparatus of the watermarking system to a cinema projector and to a web server, other applications are envisaged. For example, a receiver/decoder is envisaged in which received signals are watermarked by introducing code words upon receipt of the signals from a communicating device. For example, a set top box is typically arranged to receive television and video signals from a "headend" broadcast or multi-cast device. As will be appreciated in this application, the encoding data processing apparatus forms part of the set top box and is arranged to introduce watermark code words into the video signals as the signals are received and decoded. In one example embodiment, the watermark code word is arranged to uniquely identify the set top box which receives and decodes the video signals.

In a further embodiment a digital cinema receiver is arranged to receive a digital cinema film via a satellite. The receiver is arranged to receive signals representing the digital cinema film and to decode the signals for reproduction. The receiver includes an encoding data processing apparatus, which introduces a watermark code word into the decoded film signals. The watermark code word is provided, for example, to uniquely identify the cinema receiving the film signals.

A further example embodiment may comprise a digital camera or camcorder or the like which includes a memory and a memory controller. An encoding data processing apparatus according to an embodiment of the present invention is arranged to introduce a watermark code word stored in the memory into video signals captured by the camera. According to this embodiment, the encoding data processing apparatus does not include a code word generator because the code word is pre-stored in the memory. Under the control of the memory controller the code word stored in the memory is embedded into the video signals, uniquely or quasi-uniquely identifying the video signals.

In a further embodiment, an encoding data processing apparatus according to an embodiment of the invention is operable to encode a sequence of watermark code words into different frames of digital images forming a continuous or moving picture. The code words may be related to one another and may be used to identify each of the images separately.

Various further aspects and features of the present invention are defined in the appended claims. Various modifications can be made to the embodiments herein before described without departing from the scope of the present invention.

The invention claimed is

1. An encoding data processing apparatus for generating at least one marked version of an original item of material by introducing one of a predetermined set of code words into a copy of said material item, said apparatus comprising:
   a code word generator operable to
   generate a first code word of said predetermined set of code words using a pseudo-random number generator, the pseudo-random number generator being operable to generate pseudo-random numbers from which code word coefficients of the first code word are derived, and
   to generate other code words of the predetermined set from a cyclic shift of the code word coefficients of said first code word; and
   an encoding processor operable prior to combining a code word of said predetermined set of code words with a copy of said material item, to permute an order of the coefficients of said code word for combining with the copy of the material item in accordance with a permutation code, and to combine the code word coefficients of said code word with said copy of said material item in accordance with said permuted order, wherein said code word generator is operable to generate said pseudo-random numbers for said first code word coefficients from a seed value for initialising said pseudo-random number generator, the seed value uniquely defining said first code word.

2. An encoding data processing apparatus as claimed in claim 1, wherein said code word generator is operable to generate said seed value from the samples of said material item.

3. An encoding data processing apparatus as claimed in claim 1 or 2, comprising
a discrete cosine transform processor operable to transform said material item into the discrete cosine transform domain, said material item in said discrete cosine transform domain being represented as a plurality of discrete cosine transform coefficients, wherein said encoding processor is operable to combine said code word with said material item by adding each of said code word coefficients to a corresponding one of said discrete cosine transform coefficients, and
an inverse discrete cosine transform processor operable to form said marked copy of said material item by performing an inverse discrete cosine transform on said discrete cosine transformed image to which said code word has been added by said encoding processor.

4. A cinema projector including an encoding data processing apparatus according to claim 1, wherein said data processing apparatus is operable to receive at least one of audio signals and image signals before reproduction, and to introduce a code word into said at least one of audio signals and image signals before reproduction.

5. A web server operable to provide material items for downloading via the Internet, said web server including an encoding data processing apparatus according to claim 1, wherein said data processing apparatus is operable to receive material items and to introduce a code word into said material items before said material items are downloaded.

6. A detecting data processing apparatus operable to identify at least one of a plurality of code words present in a marked version of a material item, said marked version having been formed by combining a plurality of samples of an original version of said material with one of a corresponding plurality of code word coefficients, said plurality of code words being formed from a first code word having a plurality of pseudo-randomly distributed coefficients and by forming other code words by cyclically shifting the code word coefficients of said first code word, the code word coefficients of each of said plurality of code words being combined with said plurality of samples in a permuted order in accordance with a permutation code, said apparatus comprising:
a decoding processor operable to generate a recovered code word from said marked material item, and
a detection processor operable to detect said at least one code word from the correlation value for the code word exceeding a predetermined threshold, wherein said correlation value is formed for a plurality of said code words by
forming a Fourier transform of the recovered code word,
forming a Fourier transform of the first code word of said set,
forming the complex conjugate of one of the Fourier transform of the recovered code word and the Fourier transform of the regenerated code word,
forming intermediate product samples by multiplying each of said Fourier transform samples of said recovered code word and the corresponding Fourier transform samples of said first code word,
forming correlation samples by forming an inverse transform of said intermediate product samples, each of said correlation value samples providing the correlation value for one of said set of code words,
wherein either the decoding processor or the detection processor is operable to reverse the permuted order of each recovered code word in accordance with said permutation code.

7. A detecting data processing apparatus as claimed in claim 6, wherein said decoding processor is operable to generate said recovered code word by subtracting corresponding samples of said original material version from said samples of said marked material version, and to generate, for each of said plurality of code words a correlation sum by correlating the recovered code word with each of the plurality of code words.

8. A detecting data processing apparatus as claimed in claim 6, comprising
a registering processor operable to associate samples of said marked version of said material item with corresponding samples from said original material item to which corresponding code word coefficients may have been added.

9. A detecting data processing apparatus as claimed in claim 6, wherein said correlation processor includes a code word generator operable to generate said seed value from the samples of said marked material item.

10. A detecting data processing apparatus as claimed in claim 6, wherein said code word has been introduced into said material item in the discrete cosine transform domain, said apparatus comprising
a discrete cosine transform processor operable to transform said marked material item and said original material item into the discrete cosine transform domain, wherein said recovery processor is operable to generate said recovered code word by subtracting corresponding discrete cosine transform coefficients of said original material version from discrete cosine transform coefficients of said marked material version.

11. A system for identifying the recipient of a material item, said system comprising:
an encoding data processor for generating at least one marked version of an original item of material by introducing one of a predetermined set of code words into a copy of said material item, said encoding data processor comprising
a code word generator configured to generate a first code word of said predetermined set of code words using a pseudo-random number generator, the pseudorandom number generator being configured to generate pseudo-random numbers from which code word coefficients of the first code word are derived, and to generate other code words of the predetermined set from a cyclic shift of the code word coefficients of said first code word; and
an encoding processor configured Prior to combining a code word of said predetermined set of code words with a copy of said material item, to permute an order of the coefficients of said code word for combining with the copy of the material item in accordance with a permutation code, and to combine the code word coefficients of said code word with said copy of said material item in accordance with said permuted order, wherein
said code word generator is configured to generate said pseudo-random numbers for said first code word coefficients from a seed value for initializing said pseudo-random number generator, the seed value uniquely defining said first code word, and uniquely identifying said recipient; and a detecting data processor configured to identify the code word in the marked version of the material item, said detecting data processor comprising a decoding processor configured to generate a recovered code word from said marked material item, and a detection processor configured to detect said code word from the correlation value for the code word exceeding a predetermined threshold, wherein said correlation value is formed for a plurality of code words by forming a Fourier transform of the recovered code word, forming a Fourier transform of the first code word of said plurality of code words, forming the complex conjugate of one of the Fourier transforms of the recovered code word and the Fourier transform of the regenerated code word, forming intermediate product samples by multiplying each of said Fourier transform samples of said recovered code word and the corresponding Fourier transform samples of said first code word, forming correlation samples by forming an inverse transform of said intermediate product samples, each of said correlation value samples providing the correlation value for one of said set of code words, wherein either the decoding processor or the detection processor is configured to reverse the permuted order of each recovered code word in accordance with said permutation code, and the detecting data processor is further configured to detect with a predetermined false positive probability of the recipient by detecting the presence or absence of the code word in said material.

12. A method of generating at least one marked version of an original item of material by introducing one of a predetermined set of code words into a copy of said original material item, said method comprising:

generating a first code word of said predetermined set of code words using a pseudo-random number generator, the pseudo-random number generator generating pseudo-random numbers from which code word coefficients of the first code word are derived, the pseudo-random numbers for said first code word coefficients being generated from a seed value for initializing said pseudo-random number generator, the seed value uniquely defining said first code word, generating other code words of the predetermined set from a cyclic shift of the code word coefficients of said first code word, permuting, prior to combining a code word of said predetermined set of code words with a copy of said material item, an order of the coefficients of said code word for combining with the copy of the material item in accordance with a permutation code, and combining the code word coefficients of said code word with said copy of said material item in accordance with said permuted order.

13. A method of identifying at least one of a plurality of code words present in a marked version of a material item, said marked version having been formed by combining a plurality of samples of an original version of said material with one of a corresponding plurality of code word coefficients, said plurality of code words being formed from a first code word having a plurality of pseudo-randomly distributed coefficients and by forming other code words by cyclically shifting said first code word, the code word coefficients of each of said plurality of code words being combined with said plurality of samples in a permuted order in accordance with a permutation code, said method comprising:

generating a recovered code word from said marked material item, and detecting said at least one code word from the correlation value for the code word exceeding a predetermined threshold, wherein said correlation value is formed for a plurality of said code words by forming a Fourier transform of the recovered code word, forming a Fourier transform of the first code word of said set, forming the complex conjugate of one of the Fourier transform of the recovered code word and the Fourier transform of the regenerated code word, and forming intermediate product samples by multiplying each of said Fourier transform samples of said recovered code word and the corresponding Fourier transform samples of said first code word, forming correlation samples by forming an inverse transform of said intermediate product samples, each of said correlation value samples providing the correlation value for one of said set of code words, wherein either the step of generating or the step of detecting comprises reversing the permuted order of each recovered code word in accordance with said permutation code.

14. A computer program product providing computer executable instructions stored on a computer readable medium, which when loaded onto a data processor configures the data processor to operate as the encoding data processing apparatus according to claim 1.

15. A computer program product providing computer executable instructions stored on a computer readable medium, which when loaded onto a data processor configures the data processor to operate as the detecting data processor according to claim 6.

16. A computer program product providing computer executable instructions stored on a computer readable medium, which when loaded on to a data processor causes the data processor to perform the method according to claim 12.

17. A computer program product providing computer executable instructions stored on a computer readable medium, which when loaded on to a data processor causes the data processor to perform the method according to claim 13.

18. A receiver operable to receive signals representative of material items, comprising an encoding data processing apparatus according to claim 1, operable to combine at least one code word with the received signals, said code word being provided to identify uniquely said received signals.

19. An encoding data processing apparatus for generating at least one marked version of an original item of material by introducing one of a predetermined set of code words into a copy of said original material item, said apparatus comprising:

means for generating a first code word of said predetermined set of code words using a pseudo-random number generator, the pseudo-random number generator generating pseudo-random numbers from which code word coefficients of the first code word are derived, the pseudo-random numbers for said first code word coefficients being generated from a seed value for initialising said pseudo-random number generator, the seed value uniquely defining said first code word, means for generating other code words of the predetermined set from a cyclic shift of the code word coefficients of said first code word, means for permuting, prior to combining a code word of said predetermined set of code words with a copy of said material item, an order of the coefficients of the code word for combining with the copy of said material item in accordance with a permutation code, and means for combining the code word coefficients of said code word with said copy of said material item in accordance with said permuted order.

20. A detecting data processing apparatus for identifying at least one of a plurality of code words present in a marked version of a material item, said marked version having been formed by combining a plurality of samples of an original version of said material with one of a corresponding plurality of code word coefficients, said plurality of code words being formed from a first code word having a plurality of pseudo-randomly distributed coefficients and by forming other code words by cyclically shifting said first code word, the code word coefficients of each of said plurality of code words being combined with said plurality of samples in a permuted order in accordance with a permutation code, said apparatus comprising:

means for generating a recovered code word from said marked material item, and means for detecting said at least one code word from the correlation value for the code word exceeding a predetermined threshold, wherein said correlation value is formed for a plurality of said code words by means for forming a Fourier transform of the recovered code word, means for forming a Fourier transform of the first code word of said set, means for forming the complex conjugate of one of the Fourier transform of the recovered code word and the Fourier transform of the regenerated code word, and means for forming intermediate product samples by multiplying each of said Fourier transform samples of said recovered code word and the corresponding Fourier transform samples of said first code word, means for forming correlation samples by forming an inverse transform of said intermediate product samples, each of said correlation value samples providing the correlation value for one of said set of code words, wherein either said means for generating or said means for detecting is operable to reverse the permuted order of each recovered code word in accordance with said permutation code.

* * * * *